(12) United States Patent
Ding et al.

(10) Patent No.: US 9,026,280 B2
(45) Date of Patent: May 5, 2015

(54) METHOD FOR DETECTING THE LANDING QUALITY OF AN AIRCRAFT

(75) Inventors: Huifeng Ding, Zhejiang Province (CN); Jiaju Wu, Zhejiang Province (CN); Yubin Wu, Zhejiang Province (CN); Yi Zhu, Zhejiang Province (CN); Minjie Tang, Zhejiang Province (CN); Zhiping Huang, Zhejiang Province (CN); Lei Chen, Zhejiang Province (CN); Jiang Yuan, Zhejiang Province (CN)

(73) Assignee: Air China Limited, Shunyi District, Beijing (CN)

( * ) Notice: Subject to any disclaimer, the term of this patent is extended or adjusted under 35 U.S.C. 154(b) by 96 days.

(21) Appl. No.: 13/559,181

(22) Filed: Jul. 26, 2012

(65) Prior Publication Data

US 2013/0030614 A1 Jan. 31, 2013

(30) Foreign Application Priority Data

Jul. 27, 2011 (CN) .......................... 2011 1 0211882

(51) Int. Cl.
*B64D 45/00* (2006.01)
*G07C 5/08* (2006.01)

(52) U.S. Cl.
CPC .......... *G07C 5/085* (2013.01); *B64D 2045/008* (2013.01); *B64D 45/00* (2013.01)

(58) Field of Classification Search
CPC ..... B64D 45/00; B64D 2045/00; G07C 5/085
USPC ................. 701/15, 16, 29; 714/47.1; 244/214
See application file for complete search history.

(56) References Cited

U.S. PATENT DOCUMENTS

| | | | | |
|---|---|---|---|---|
| 6,015,117 | A  * | 1/2000 | Broadbent | 244/214 |
| 2009/0210105 | A1 * | 8/2009 | Lusby et al. | 701/15 |
| 2010/0114411 | A1 * | 5/2010 | Schmidt | 701/16 |
| 2011/0046825 | A1 * | 2/2011 | Lastere et al. | 701/16 |
| 2011/0276217 | A1 * | 11/2011 | Sim et al. | 701/29 |

FOREIGN PATENT DOCUMENTS

WO    WO 2010/116169 A1 * 10/2010

* cited by examiner

*Primary Examiner* — Fadey Jabr
*Assistant Examiner* — Aaron L Troost
(74) *Attorney, Agent, or Firm* — Nath, Goldberg & Meyer; Joshua B. Goldberg; Katelyn J. Bernier

(57) ABSTRACT

Provided herein is a method for detecting landing quality of an aircraft. Method steps include using an aircraft data system to determine whether a vertical speed rate is greater than a first preset value when the aircraft lands; determine whether a vertical acceleration is greater than a second preset value if the vertical speed rate is not greater than the first preset value when the aircraft lands; collect landing data; generate a landing message based on the collected landing data; store or transmit the landing message; and determine the landing quality based on the landing data in the landing message.

15 Claims, 8 Drawing Sheets

LOAD REPORT <530>

|    | A/C ID<br>Aircraft No. | DATE UTC<br>UTC Time | FROM<br>Taking off | TO<br>Landing | FLT<br>Flight No. | |
|----|---|---|---|---|---|---|
| CC | BXXXX | yyyy-dd-mm xx:xx:xx | - | - | - | |
|    | PH<br>Flight phase | CNT<br>Count | CODE<br>Trigger code | BLEEDSTATUS | APU<br>APU Bleed Air valve | |
| C1 | 07 | 490 | 4101 | 56 0011 0 1100 56 | X | |
|    | TAT<br>Total air<br>temperature | ALT<br>Altitude | CAS<br>Calculate Air<br>Speed | MN<br>Mach Speed | GW<br>Gross<br>Weight | CG<br>Gravity<br>Center | DMU<br>Version |
| CE | 0215 | 00073 | 121 | 184 | 5459 | 30.9 | I71CA1 |
|    | ESN<br>Engin No. | EHRS<br>Engine Hour | AP<br>Automatic<br>Piloting | FLAP | SLAT | | |
| EC | - | 00855 | 06 | 3900 | 2700 | | |
| EE | - | 00855 | 06 | 3900 | 2699 | | |

MIT EXCEEDANCE AND SPOILER EXT SUMMARY

|    | MAX | LIM | | COUNTS | | | |
|----|---|---|---|---|---|---|---|
| N1 | S~.Z | S~.Z | | | | | |
| E1 | -015 | -005 | 000 | 000 | 000 | 000 | |

REASON: CUSTOMER

VALUES AT 1 SEC BEFORE LAND/EVENT

|    | RALT | RALR | PTCH | PTCR | ROLL | ROLR | YAW |
|----|---|---|---|---|---|---|---|
| N2 | SZZZ | S~.Z | S~.Z | S~.Z | S~.Z | S~.Z | S~.Z |
| S1 | 0002 | -044 | 0048 | -001 | -012 | 0000 | -005 |

VALUES AT LAND/EVENT

| S2 | -00 | -018 | 0047 | -015 | 0000 | -040 | -002 |

MAX/MIN 1 SEC TO 3 SEC INTERVAL

|    | VRTA<br>Vertical load | LONA<br>Longitudinal<br>load | LATA<br>Lateral load |
|----|---|---|---|
| N3 | SZ.ZZ | SZ.ZZ | SZ.ZZ |
| S3 | 0164 | 0011 | 0021 |
| S4 | 0061 | -010 | -007 |

Fig.8

LOAD REPORT <530>

| | A/C ID | DATE UTC | | FROM | TO | FLT | |
|---|---|---|---|---|---|---|---|
| | Aircraft No. | UTC Time | | Taking off | Landing | Flight No. | |
| CC | BXXXX | yyyy-dd-mm xx:xx:xx | | - | - | - | |
| | PH | CNT | CODE | BLEEDSTATUS | | APU | |
| | Flight phase | Count | Trigger code | | | APU Bleed Air valve | |
| C1 | 07 | 490 | 4101 | 56 0011 0 1100 56 | | X | |
| | TAT | ALT | CAS | MN° | GW | CG | DMU |
| | Total air temperature | Altitude | Calculate Air Speed | Mach Speed | Gross Weight | Gravity Center | Version |
| CE | 0215 | 00073 | 121 | 184 | 5459 | 30.9 | I71CA1 |
| | ESN | EHRS | AP | FLAP | SLAT | | |
| | Engin No. | Engine Hour | Automatic Piloting | | | | |
| EC | - | 00855 | 06 | 3900 | 2700 | | |
| EE | - | 00855 | 06 | 3900 | 2699 | | |
| | MIT EXCEEDANCE AND SPOILER EXT SUMMARY | | | | | | |
| | MAX | LIM | | COUNTS | | | |
| E1 | 2.65 | 2.6 | 000 | 000 | 000 | 000 | |
| | REASON: | VRTA | | | | | |
| | VALUES AT 1 SEC BEFORE LAND/EVENT | | | | | | |
| | RALT | RALR | PTCH | PTCR | ROLL | ROLR | YAW |
| S1 | 0002 | -110 | 0048 | -001 | -012 | 0000 | -005 |
| | VALUES AT LAND/EVENT | | | | | | |
| S2 | -00 | -072 | 0047 | -015 | 0000 | -040 | -002 |
| | MAX/MIN 1 SEC TO 3 SEC INTERVAL | | | | | | |
| | VRTA | LONA | LATA | | | | |
| | Vertical load | Longitudinal load | Lateral load | | | | |
| S3 | 0207 | 0031 | 0042 | | | | |
| S4 | 0089 | -011 | -009 | | | | |
| | VALUES AT 1 SEC BEFORE BOUNCED | | | | | | |
| | RALT | RALR | PTCH | PTCR | ROLL | ROLR | YAW |
| T1 | 0002 | 042 | 0047 | -001 | -011 | 0000 | -005 |
| | VALUES AT BOUNCED | | | | | | |
| T2 | -00 | -015 | 0047 | -015 | 0000 | -040 | -002 |
| | MAX/MIN 1 SEC TO 3 SEC INTERVAL | | | | | | |
| | VRTA | LONA | LATA | | | | |
| T3 | 0265 | 0010 | 0010 | | | | |
| T4 | 0060 | -010 | -007 | | | | |

Fig.9

METHOD FOR DETECTING THE LANDING QUALITY OF AN AIRCRAFT

TECHNICAL FIELD OF THE INVENTION

The present invention relates to a method for detecting operation conditions of an aircraft, in particular to a method for detecting the landing quality of the aircraft.

BACKGROUND

The so-called "heavy landing" or "hard landing" indicates a landing event in which speed or acceleration speed of the aircraft in vertical direction is above respective limit value when landing, wherein heavy landing means that vertical speed or acceleration speed of the aircraft is above respective limit value when landing in case that the landing weight of the aircraft is above the maximum landing weight, and hard landing means that vertical speed or acceleration speed of the aircraft is above respective limit value when landing in case that the landing weight of the aircraft is less than or equal to the maximum landing weight. The hard/heavy landing can impose strong impact and vibration on the structure of the aircraft, particularly the components withstanding greater loads such as the wing, landing gear, engine and the like, and cause failure of the structure of the aircraft. Therefore, the airline must perform a strict safety-check on the aircraft to ensure aviation safety once the hard/heavy landing occurs.

Different aircrafts have different limit values. For example, the limit value of vertical landing acceleration speed of Boeing B747-400 is 1.7 G, the limit value of vertical landing acceleration speed of Boeing B737-600 is 2.1 G, and the limit value of vertical landing acceleration speed of Airbus A320 is 2.6 G.

According to provisions of aircraft manufacturer, the subject of liability for reporting the happened hard/heavy landing event is the flight crew. However, the hard/heavy landing event reported by the flight crew has great uncertainty. The final results of most hard/heavy landing events reported by the flight crew are "the hard/heavy landing has not occurred". But the processing causes an interruption of service of the aircraft and a big waste of maintenance resource.

Over-limit data statistics and trend analysis, which are useful for eliminating hidden dangers and ensuring the safety, can be obtained through decoding the data in the QAR (Quick Access Recorder). However, it can often be found that there exist large differences between the result of decoding the data in the QAR and the actual situation when analyzing the hard or heavy landing event. Therefore, the data obtained from QAR decoding cannot directly be used to determine the hard/heavy landing event.

The airframe structure message of the aircraft also can be used to determine the hard or heavy landing event. The airframe structure message is one kind of aircraft system message and is automatically generated by the aircraft data system. However, it is found in practical applications that in many cases the aircraft system does not generate the airframe structure message although the flight crew has reported the hard or heavy landing event. Therefore, the airframe structure message cannot directly be used to determine the hard or heavy landing event, either.

Therefore, repairmen have to provide the original flight data to the aircraft manufacturer for analysis once the flight crew reports the hard or heavy landing event according to conventional technique. Such manner is not only expensive but also time-consuming and influences the aircraft's normal flight.

SUMMARY

For one or more technical problem of the conventional technology, one aspect of the invention provides a method for detecting landing quality of the aircraft, comprising: determining whether a vertical speed rate is greater than a first preset value or a vertical acceleration is greater than a second preset value when the aircraft lands; collecting landing data; generating a landing message based on collected landing data in response to that the vertical speed rate is greater than the first preset value or the vertical acceleration is greater than the second preset value when the aircraft lands; storing or transmitting the landing message; and determining the landing quality of the aircraft based on the landing data in the landing message.

According to another aspect of the invention there is provided a method for detecting landing quality of an aircraft, comprising: determining whether the aircraft touches down; collecting a landing data in response to the touchdown of the aircraft; determining whether a hop occurs when the aircraft lands; collecting a secondary landing data when the aircraft touches down again in response to that the hop occurs when the aircraft lands; generating a landing message according to the collected landing data and the secondary landing data; storing or transmitting the landing message; and determining the landing quality based on the landing data of the landing message.

BRIEF DESCRIPTION OF THE DRAWINGS

Hereinafter, some preferred embodiments of the invention will be described in reference to the accompanying drawings.

FIG. 8 is an example of the short landing message according to one embodiment of the present invention.

FIG. 9 is an example of the long landing message according to one embodiment of the present invention.

DETAILED DESCRIPTION

The aircraft data system achieves great development, such as ACMS (Aircraft Condition Monitoring System) of Airbus and AHM (Aircraft Heath Monitor) of Boeing, as the aircraft system is more and more complicated.

Taking the ACMS as an example, the ACMS monitors the performance of multiple important components of the aircraft including: the engine, crew, APU (Airborne Auxiliary Power Unit) and cabin. The ACMS also has functions such as aircraft performance monitoring, data recording, special investigation & trouble shooting and the like.

The ACMS monitors more than 13,000 flight data in real time. Moreover, the ACMS can automatically generate messages including specific data according to real-time monitored data, when a certain trigger condition is met.

The ACMS includes an AIDS (Aircraft Integrated Data System), wherein, a DMU (Data Management Unit) is the core of the AIDS. The DMU has the following two important functions:
- collecting, processing and recording many parameters in the aircraft, including data from the black box. These parameters are stored in an internal non-volatile storage memory of the DMU or an external recorder, such as a digital AIDS recorder (DAR);
- generating system messages, and triggering and generating the messages when the trigger condition is satisfied by the aircraft state or system parameters. These messages are stored in a nonvolatile storage memory in the DMU.

Figure 1:
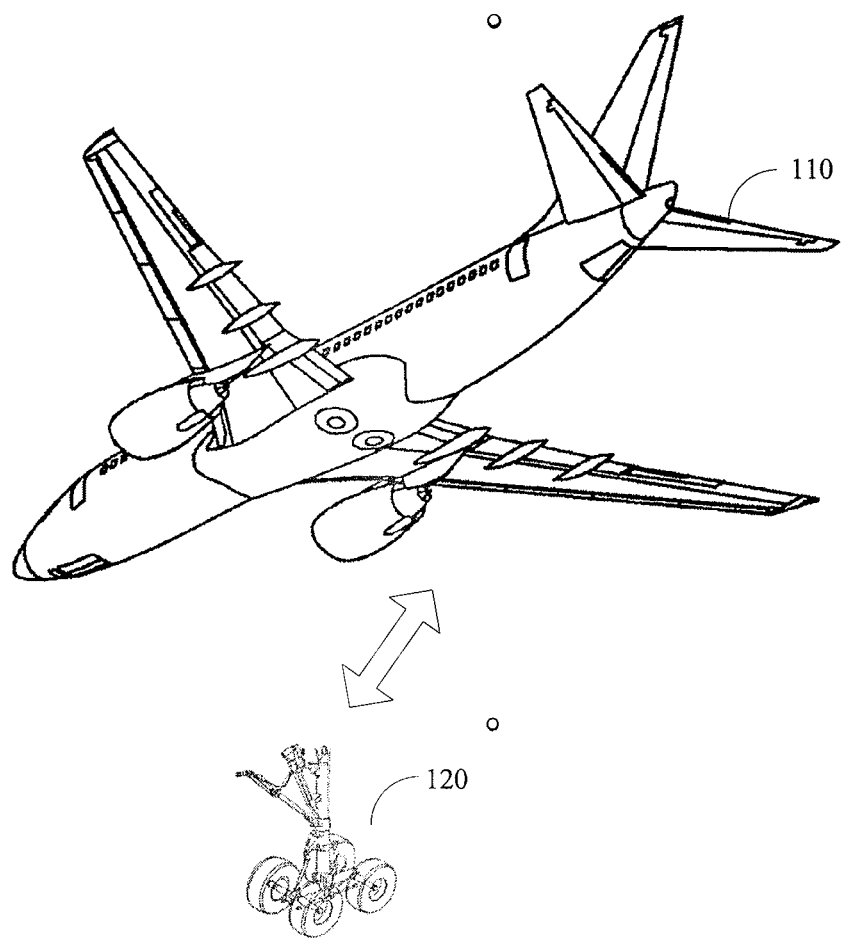
FIG. 1 is a schematic illustrating how to obtain landing data of aircraft using ACMS according to one embodiment of the present invention.

FIG. 1 is a schematic illustrating how to obtain landing data of aircraft using ACMS according to one embodiment of the present invention. As shown, the aircraft 110 includes the ACMS and the landing gear 120 (only a part of a main landing gear is shown in the figure). A sensor provided on the landing gear 120 is connected to the ACMS of the aircraft 110. The sensor of the landing gear 120 monitors that the aircraft has touched the ground during landing of the aircraft, the ACMS obtains the landing data of the aircraft through other sensors connected thereto, so as to determine whether the hard or heavy landing occurs during landing of the aircraft.

Figure 2:
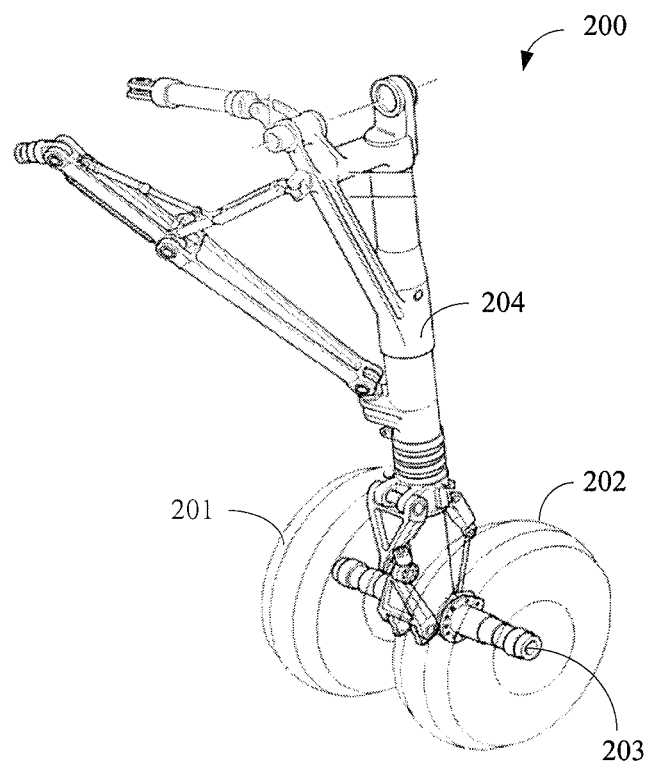
FIG. 2 is a schematic illustrating a structure of a part of the landing gear of the aircraft according to one embodiment of the present invention.

FIG. 2 is a schematic illustrating a structure of a part of the landing gear of the aircraft according to one embodiment of the present invention. As shown, the landing gear includes: aircraft wheels 201 and 202. The aircraft wheels 201 and 202 are connected to a shock strut 204 through axle assembly 203. The shock strut 204 includes a telescopic structure which utilizes an action of hydraulic piston. When the aircraft wheels 201 and 202 touch the ground, the shock strut 204 is compressed to a compression state from an extension state to provide a buffer function and to soften the impact applied on the aircraft during the landing.

The shock strut 204 is provided with a sensor which can reflect whether the shock strut 204 is in the compression state or the extension state through the change of state of a PSEU (Proximity Switch Electronic Unit). The monitoring of the state of the shock strut 204 can be realized through the sensor on the shock strut 204, and thus it can be realized to determine whether the aircraft touches down. The ACMS obtains data of vertical speed and vertical acceleration and related flight attitude data through other sensors connected to the ACMS after the ACMS determines that the aircraft has touched the ground. The landing data includes but is not limited to the following data:

1. RALT (radio altitude, its unit is ft), RALR (vertical speed rate, its unit is ft/sec), PTCH (pitch angle, its unit is deg), PTCR (pitch speed rate, its unit is deg/sec), ROLL (rolling angle, its unit is deg), ROLR (rolling speed rate, its unit is deg/sec), and YAW (yaw speed rate, its unit is deg/sec) at the time of 1 second before touchdown;

2. RALT (radio altitude, its unit is ft), RALR (vertical speed rate, its unit is ft/sec), PTCH (pitch angle, its unit is deg), PTCR (pitch speed rate, its unit is deg/sec), ROLL (rolling angle, its unit is deg), ROLR (rolling speed rate, its unit is deg/sec), and YAW (yaw speed rate, its unit is deg/sec) at the time of touchdown;

3. Respective maximum values and minimum values of VRTA (vertical load), LONA (longitudinal load) and LATA (lateral load) from the time of 1 second before touchdown to the time of touchdown; and 4. Respective maximum values and minimum values of VRTA (vertical load), LONA (longitudinal load) and LATA (lateral load) from the time of 1 second before touchdown to the time of 3 seconds after touchdown.

Figure 3:
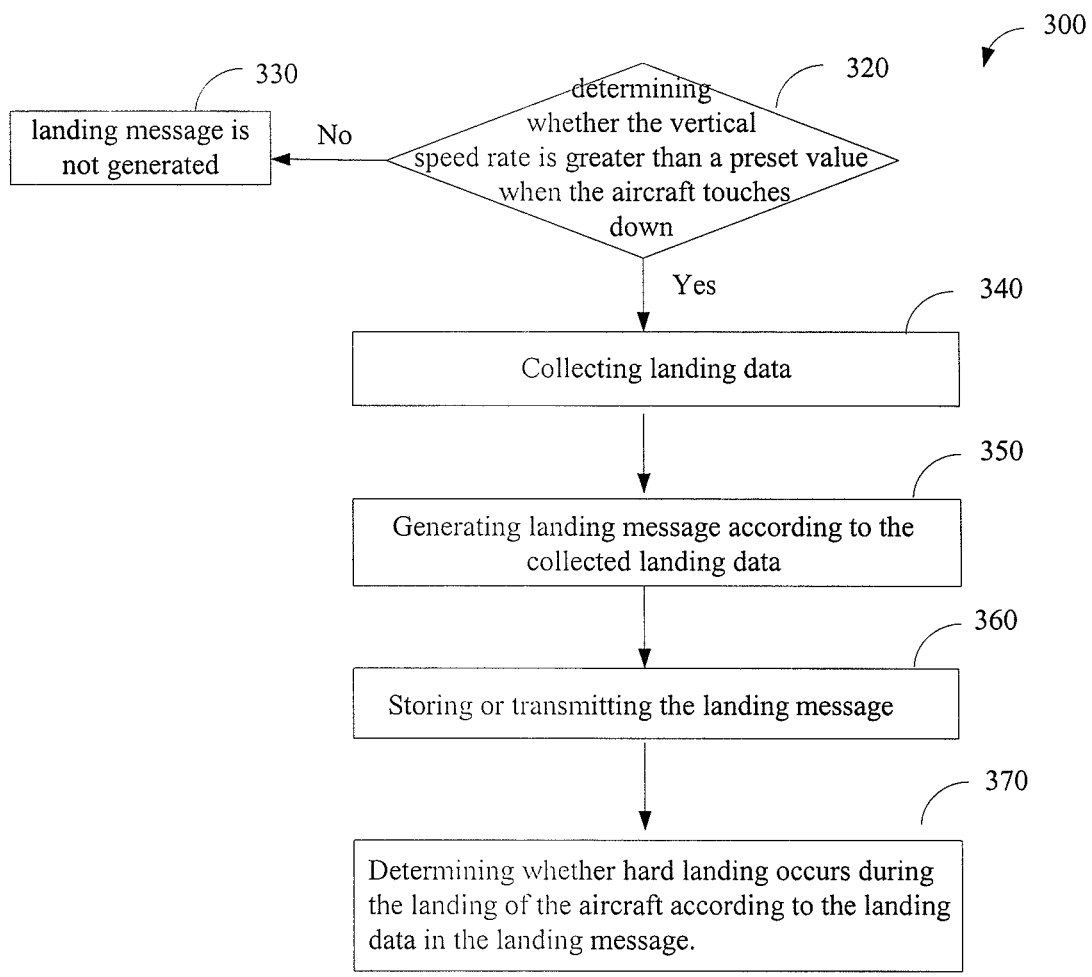
FIG. 3 is a flow chart illustrating a method for detecting the aircraft's hard or heavy landing according to one embodiment of the present invention.

It should be noted that the data obtained by the ACMS is measured in real time and stored in a data caching. When a pre-set trigger condition is met, it is possible and can be realized to obtain related data (corresponding to the time before triggering) from the data caching FIG. 3 is a flow chart illustrating a method for detecting the aircraft's hard or heavy landing according to one embodiment of the present invention. As shown, the method 300 for detecting the hard or heavy landing of the aircraft in this embodiment includes: at step 320, determining whether the vertical speed rate is greater than a preset value when the aircraft touches down; if the vertical speed rate is not greater than the preset value, the landing message need not be generated at step 330.

It is ensured that all of data of suspected landing events can be recorded through setting a suitable preset value for the vertical speed rate at step 320. According to one embodiment of the present invention, the absolute value of the preset value for the vertical speed is less than or equal to 0.5 ft/s (feet/second). That preset value for the vertical speed can ensure that data can be obtained and the landing message can be generated every time the aircraft touches down, even the aircraft touches down normally.

Another advantage for setting the preset value for the vertical speed is that the trigger condition for generating the landing message can be changed flexibility, the user can collect and record data of landing state of the aircraft based on actual requirements rather than only collect and record data related to hard or heavy landing or collect and record data at each landing. For example, the preset value for the vertical speed rate can be lowed, e.g., 20%-40% less than the limit value of the vertical speed rate, so that data is collected and recorded and the landing message is generated as long as the landing is relatively hard.

Landing data is collected at step 340 if the vertical speed rate when landing is greater than the preset value. Then, at step 350, the landing message is generated according to the collected landing data. At step 340, the ACMS of the aircraft may be used to collect the landing data. The DMU of the ACMS starts corresponding collecting processing of the landing data according to a specific trigger condition. After data collection is finished, at step 350, the landing message is generated according to the collected landing data.

At step 360, the landing message is stored or transmitted. At step 370, it is determined whether the hard or heavy landing occurs during the landing of the aircraft according to the landing data in the landing message.

According to one embodiment of the present invention, it is determined whether the hard or heavy landing occurs through determining whether the value of speed or acceleration in vertical direction when landing is greater than their respective limit value. Considered from the limit of structural strength of the aircraft, the limit value of vertical speed rate of the aircraft relates to the landing weight of the aircraft. When determining whether the RALR (vertical speed rate) is greater than the limit value thereof, comparison should be respectively performed according to the landing weight of the aircraft. According to one embodiment of the present invention, the limit value is −9 ft/sec, where the landing weight of the aircraft is less than the maximum landing weight; the limit value is −6 ft/sec, where the landing weight of the aircraft is greater than the maximum landing weight. The values mentioned above are only examples, and the limit values of different aircrafts may be different where the landing weight is greater or less than maximum landing weight thereof.

Similar to the logic of determining whether the vertical speed rate is greater than the limit value thereof, when determining whether the VRTA (vertical load) is greater than the limit value thereof, the limit value of vertical load of the aircraft also relates to the landing weight of the aircraft. According to one embodiment of the present invention, the limit value is 2.6 G, where the landing weight of the aircraft is less than the maximum landing weight; the limit value is 1.7 G, where the landing weight of the aircraft is greater than the maximum landing weight. The values mentioned above are only examples, and the limit values of different aircrafts may be different where the landing weight is greater or less than maximum landing weight thereof.

Many times, it can be directly determined whether the hard or heavy landing occurs through considering whether the vertical speed rate and vertical acceleration speed when landing are greater than or close to their respective limit values. It can provide valuable reference information for determining whether the hard landing occurs when landing, even through a determination cannot be obtained directly. If it can be determined whether the hard or heavy landing occurs when the aircraft lands through a combination of flight crew's report and other factors, the original data need not to be transmitted to the airline to be processed.

Figure 4:
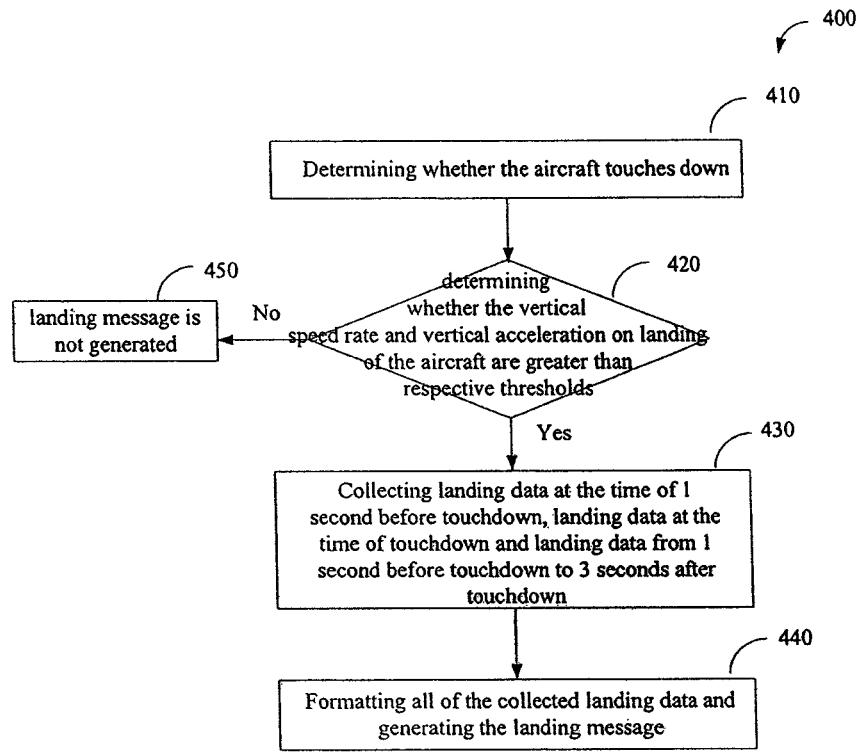
FIG. 4 is a flow chart illustrating a method for generating a landing message using ACMS according to one embodiment of the present invention.

FIG. 4 is a flow chart illustrating a method for generating a landing message using ACMS according to one embodiment of the present invention. As shown, the method 400 for collecting landing data in this embodiment includes: at step 410, determining whether the aircraft touches down. According to one embodiment of the present invention, it is determined whether the aircraft touches down through detecting whether the shock strut in left main landing gear and/or the shock strut in right main landing gear are converted to the compression state from the extension state.

If the aircraft has touched down, then at step 420, it is determined whether the vertical speed rate and vertical acceleration on landing of the aircraft are greater than respective thresholds. Meanwhile, at step 430, the following data is collected: landing data at the time of 1 second before touchdown, landing data at the time of touchdown and landing data from 1 second before touchdown to the time of 3 seconds after touchdown. At step 440, if any one of the vertical speed rate and vertical acceleration speed is greater than respective thresholds, all of the collected landing data is formatted and then the landing message is generated; otherwise, the landing message is not generated.

Figure 5:
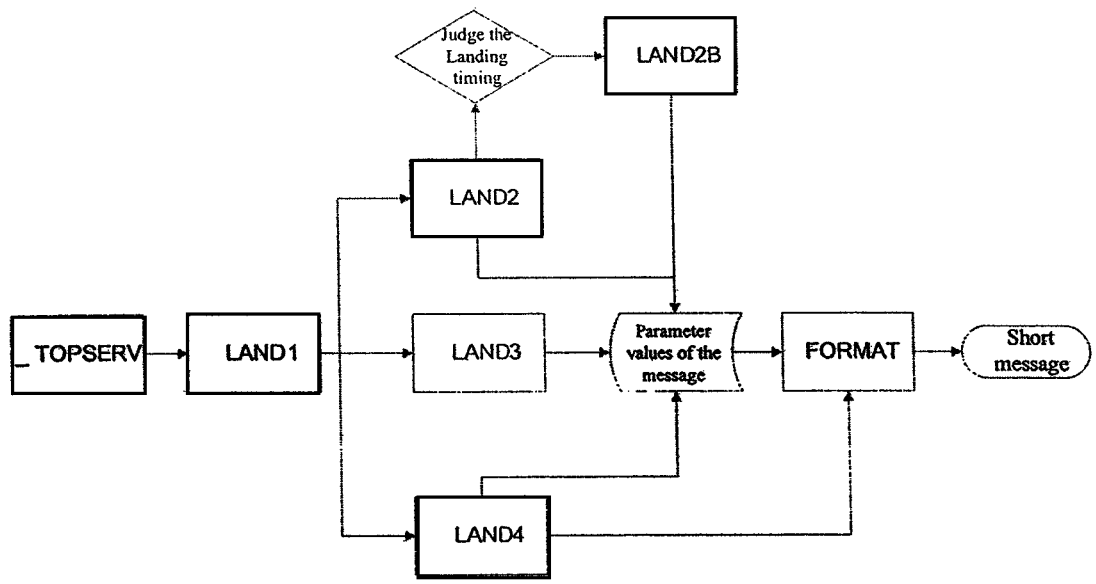
FIG. 5 is a schematic illustrating relationship of triggers for generating short landing messages in the ACMS according to one embodiment of the present invention.

FIG. 5 is a schematic illustrating relationship of triggers in the ACMS for generating short landing messages according to one embodiment of the present invention. The triggers shown in FIG. 5 can be used in the method shown in FIG. 4. As shown in FIG. 5, in the DMU, the top service TOPSERV is a trigger reserved by the system, which corresponds to a main thread of a processor or a base service of an operating system. All of other triggers are started or activated by the TOPSERV. Just before the aircraft is going to land, in the FINAL APPR stage where slat release is more than 5° and the flight altitude is less than 10000 feet, the TOPSERV in the DMU activates the trigger LAND1 for monitoring whether the aircraft touches down.

When the LAND1 detects the compression of any one of the left or right main landing gear, that is, the change of state of the PSEU, "the aircraft touch down" is marked. Meanwhile, the LAND1 activates triggers LAND2 or LAND2B, LAND3 and LAND4, wherein, both of LAND2 and LAND2B are used to determine whether the RALR (vertical speed rate) and VRTA (vertical acceleration) are greater than respective threshold values. The LAND3 and LAND4 activated by LAND1 record the landing data.

After the LAND4 is finished, all of parameters in the short message have been collected, and then the formats of parameters are converted so as to facilitate reading and printing and finally the landing message is generated.

According to one embodiment of the present invention, during the processing of determining the landing of the aircraft by the LAND1, the operating LAND1 reads data of the PSEU's state of the shock struts in the left and right main landing gears. The detecting frequency is 32 times/sec to detect whether the state changes in 1/32 second. If the parameter indicating the positional state changes from 0 to 1, it means any one of shock struts turns into the compression state from the extension state, therefore, it is determined that the aircraft has landed. This time is right the starting point of landing time of the aircraft.

According to one embodiment of the present invention, the LAND2 and LAND2B determine whether the RALR and VRTA when the aircraft touches down are greater than respective threshold values through the following manners. In order to reflect the landing state of the aircraft more accurately, it is needed to determine whether the RALR and VRTA in a period from 0.5 second before landing to 0.5 second after landing are greater than respective threshold values.

In this embodiment, the LAND2 is activated firstly. The LAND1 outputs a landing time value $T_0$, which is an integral number between 0-32. The LAND2 compares $T_0$ with a fine-adjustment parameter CHK which is between 0-5. If $T_0/2-CHK<0$, it means the landing time is too close to the measuring time and thus it is possible that the data change caused by landing has not been reflected in the measured parameters. Therefore, the LAND2B is activated for determining whether the RALR and VRTA at the time of 1 second after landing time are greater than respective threshold values, and the LAND2 is terminated. If $T_0/2-CHK>0$, the LAND2 determines whether the RALR and VRTA at the landing time are greater than respective threshold values. If not, the LAND2 compares $T_0$ with 16 to determine whether $T_0-16>0$. If $T_0-16<0$, in order to reflect the landing state of the aircraft more accurately, the LAND2B is activated to determine whether the RALR and VRTA at the time of 1 second after landing time are greater than respective threshold values, and the LAND2 is terminated. Once any one comparison performed by the LAND2 and LAND2B indicates that the RALR and VRTA at the landing time are greater than respective threshold values, it means that the landing state of the aircraft meets the requirement to generate the landing message.

In this embodiment, it can be accurately determined whether the RALR and VRTA in the period from 0.5 second before to 0.5 second after the touchdown time are greater than respective threshold values through the operation of two triggers in different periods.

According to one embodiment of the present invention, it is determined under a certain condition whether the vertical load, i.e., VRTA, is greater than its threshold value. Only when the RALR is not greater than the threshold value, the trigger will further determine whether the VRTA is greater than its threshold value. If the RALR is greater than its threshold value, determining whether VRTA exceeds its threshold can be omitted, and the short landing message can be generated directly.

According to one embodiment of the present invention, the vertical speed rate RALR can be obtained in the LAND2 and LAND2B using the following method. On the aircraft, the sampling frequency of the RALR is 16 times/sec. In order to reflect the actual RALR more accurately, the measured RALR needs to be corrected, i.e., the measured RALR is corrected based on the vertical speed rate −IVV measured by the ADIRU (Air Data and Inertial Reference Units) according to the pitching, rolling attitude, respective accelerations along three axes and constant.

According to one embodiment of the present invention, the RALR also can be obtained using the following program segment:

---

IVV = IVV actual sample n (current value of vertical speed rate)
IVV1 = IVV previous sample n−1 ( a preceding sample of vertical speed rate )
PTCHACC = PTCHACC actual sample n ( current value of pitch acceleration , intermediate variable )
PTCHACC1 = PTCHACC previous sample n−1 ( a preceding (n−1) sample of pitch acceleration , intermediate variable )
PTCHACC2 = PTCHACC previous sample n−2 ( No.n−2 sample of pitch acceleration , intermediate variable )
PTCR : pitch speed rate
PTCR1 : a preceding sample of pitch speed rate
PTCHRAW: pitch ( intermediate variable )
PTCHRAW1 : a preceding sample of pitch ( intermediate variable )
VACC : vertical acceleration ( from inertial navigation )
RALT: radio altitude
PTCH: pitch
Constants :

D geometrical correction factor for ROLR ft/deg (default is 0)
DX lever arm correction (x-axis) for R/A RALT ft ( 321 aircraft : 28.8 / 320 aircraft : 18 / 319aircraft : 18.5 / 318 aircraft : 16.8 )
DZ lever arm correction (z-axis) for R/A RALT ft ( 321 aircraft : 7.8 / 320 aircraft : 7.1 / 319 aircraft : 7.2 / 318 aircraft : 7.6 )
DXTPIR lever arm correction (x-axis) for PTCH ft (321 aircraft : 53.1 / 320 aircraft : 39 / 319 aircraft : 33.8 / 318 aircraft : 29.5 )
FC filter frequency Hz ( default is "0.3 " )
K1 filter constant ( default is "5.2")
K2 filter constant ( default is "25" )
K3 filter constant ( default is "5")
THETA0 average PTCH at touchdown deg ( 321 aircraft : 4.5 / 320 aircraft :6 / 319 aircraft : 2 / 318 aircraft : 6 )

---

Initialization of parameters:

$PTCHRAW1=0.0$ $PTCHACC1=0.0$ $PTCHACC2=0.0$ $PTCR1=0.0$ $EN1=0.0$ $VZN1=IVV/60.0$ $ZN1=RALT$ $PTCHRAW=(PTCR-PTCR1)/T(T=1/16)$ $PTCHACC=PTCHACC1+T*(2*PI*FC)*(PTCHRAW+PTCHRAW1-PTCHACC1-PTCHACC2)/2(PI=3.14159265)$ $NZTCOR=VACC*9.81/0.3048-DXTPIR*PTCHACC/57.3*\cos(PTCH/57.3)$ $HRACOR=RALT+DX*(\sin(PTCH/57.3)-\sin(THETA0/57.3))-DZ*(\cos(PTCH/57.3)-\cos(THETA0/57.3))$ $EPSN=ZN1-HRACOR$ $EN=EN1+T*(K3*EPSN)$ $VZN=VZN1+T*(ZTCOR-EN-*EPSN)$ $VZNU=VZN-D*ABS(ROLR)$ $RALR=VZNU$ $ZN=ZN1+T*(VZN-K1*EPSN)$ The above shows the process to calculate a sample of RALR. Other samples can be calculated by iteration after the first sample is obtained. The iteration method is as follows:

$EN1=EN$ $VZN1=VZN0$ $ZN1=ZN$ $PTCHACC2=PTCHACC1$ $PTCHACC1=PTCHACC$ $PTCHRAW1=PTCHRAW$ $PTCR1=PTCR$

According to one embodiment of the present invention, the LAND2 and LAND2B can directly obtain the vertical acceleration from the vertical load obtained by the ACMS.

According to one embodiment of the present invention, the LAND3 can realize the following functions:
 a) recording the values of RALT, RALR, PTCH, PTCR, ROLL, ROLR and YAW at (corresponding to) the time of 1 second before the landing time;
 b) recording the values of RALT, RALR, PTCH, PTCR, ROLL, ROLR and YAW at the landing time.

According to one embodiment of the present invention, the operation time of the LAND4 is 4 seconds for recording the maximum values and minimum values of VRTA, LONA, LATA and RALR in the period from 1 second before the landing time to 3 seconds after the landing time.

Figure 6:
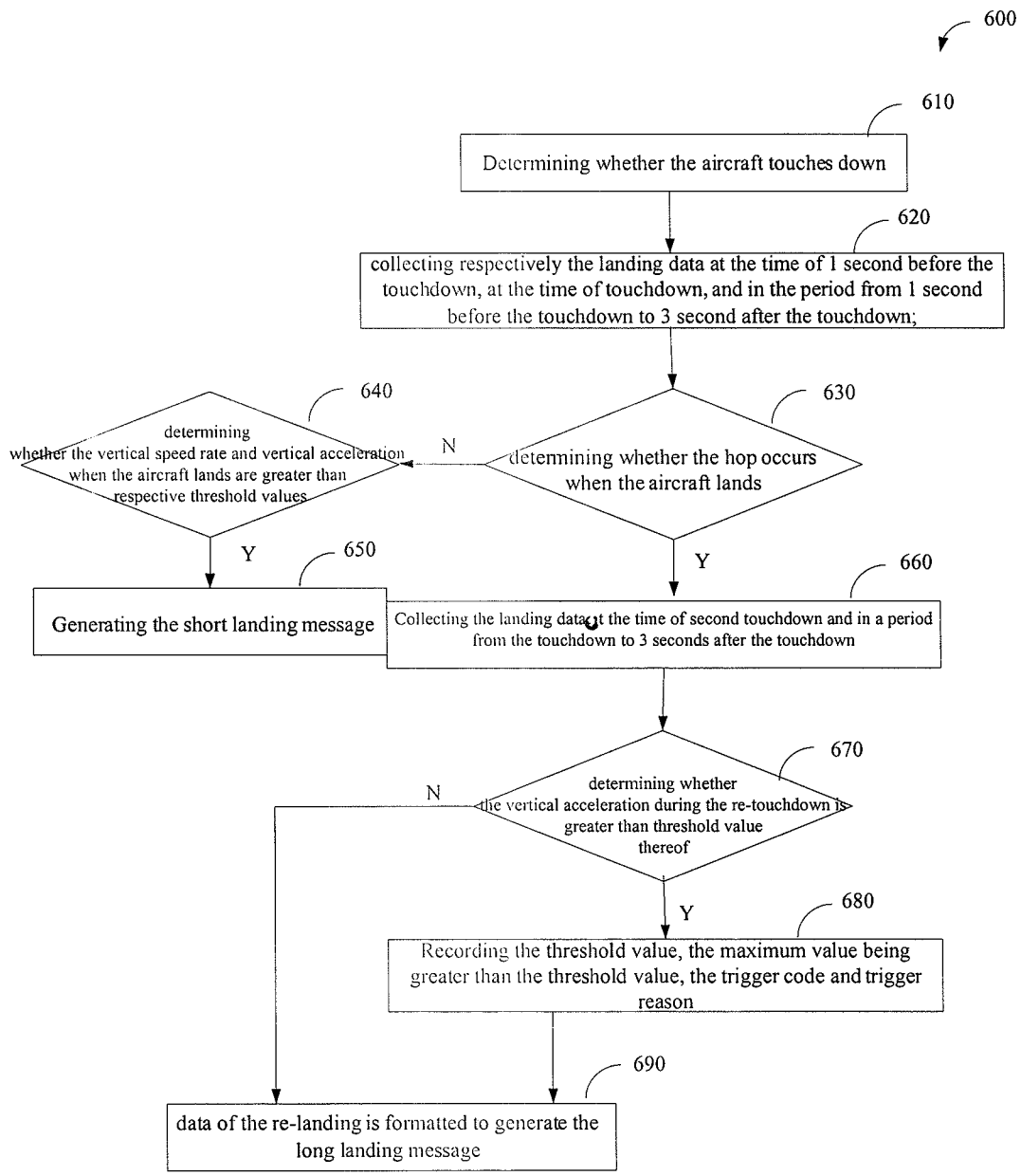
FIG. 6 is a flow chart illustrating a method for generating the landing message using ACMS according to another embodiment of the present invention.

FIG. 6 is a flow chart illustrating a method for generating the landing message using ACMS according to another embodiment of the present invention. The rebound force of the ground when landing may bounce the aircraft, and then the aircraft will hit the ground again. This phenomenon is called "hop" of the aircraft. Such hop when landing may occur once or several times. The hop is very likely to be the hard or heavy landing, therefore, the hop needs to be monitored. The landing message related to the hop when landing is a long landing message, while the ordinary message is a short landing message.

As shown in FIG. 6, the method for generating the long landing message in this embodiment includes: at step 610, determining whether the aircraft touches down; at step 620, collecting respectively the landing data at the time of 1 second before the touchdown, at the time of touchdown, and in the period from 1 second before the touchdown to 3 second after the touchdown; at step 630, determining whether the hop occurs when the aircraft lands. If the hop does not occur, determining whether the vertical speed rate and vertical acceleration when the aircraft lands are greater than respective threshold values at step 640; if yes, the short landing message is generated at step 650; if no, the landing message is not generated.

If the hop occurs, the landing data at the time of 1 second before the re-touchdown and 3 second after the re-touchdown is collected respectively; meanwhile, determining whether the vertical acceleration during the re-touchdown is greater than threshold value thereof at step 670; if yes, the threshold value, the maximum value being greater than the threshold value, the trigger code and trigger reason are recorded at step 680. At step 690, data of the re-landing is formatted to generate the long landing message.

According to one embodiment of the present invention, it is determined whether the hop occurs during landing through determining whether two main landing gears have been compressed and kept in the compression state for an enough long period and then whether the left and right main landing gears are in extension state again. It is determined that the aircraft touches down again (re-touchdown, re-landing) through further determining the period is less than 10 seconds in which the left and right main landing gears are in extension state again, and thus it is further determined that the hop occurs.

Figure 7:
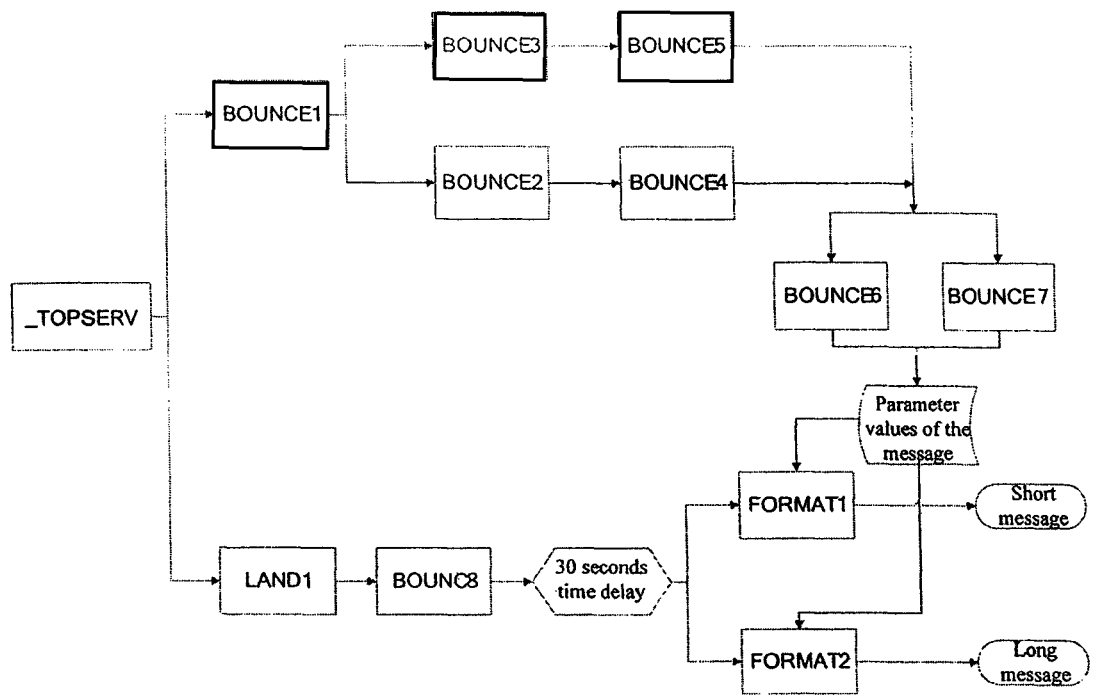
FIG. 7 is a schematic illustrating relationship of triggers for generating long landing messages in the ACMS according to one embodiment of the present invention.

FIG. 7 is a schematic illustrating relationship of triggers for generating long landing messages in the ACMS according to one embodiment of the present invention. The trigger shown in FIG. 7 can be used in the method shown in FIG. 6. As shown in FIG. 7, in the DMU, the TOPSERV is a trigger reserved by the system. Just before the aircraft is going to land, in the FINAL APPR stage where slats release is greater than 5° and the flight altitude is less than 10000 feet, the TOPSERV in the DMU activates the triggers BOUNCE1 and LAND1. The BOUNCE1 is used for monitoring whether the two main landing gears are compressed and kept being compressed for enough long time.

If the BOUNCE1 determines the two main landing gears are compressed and kept compressed for an enough long time, the BOUNCE1 will activate the triggers BOUNCE2 and BOUNCE3, which respectively are used for detecting whether the left and right main landing gears are in the extension state again. And then, the BOUNCE2 and BOUNCE3 activate corresponding triggers BOUNCE4 and BOUNCE5 to further determine the flight state of the aircraft. The BOUNCE4 and BOUNCE5 respectively detect continuously the extension state of the shock struts in the left and right main landing gears, and determine the hop occurs when a certain condition is met.

The BOUNCE4 and BOUNCE5 respectively activate the triggers BOUNCE6 and BOUNCE7 to search, compare and collect the landing data at the time of 1 second before the re-touchdown and in the period from the re-touchdown to 3 seconds thereafter.

The BOUNCE7 also searches and makes a comparison to determine whether the vertical acceleration on the re-touchdown is greater than the threshold value thereof. If yes, the threshold value, the maximum value being greater than the threshold value, the trigger code and trigger reason are recorded in the message.

The method for obtaining the landing data used by the BOUNCE6 and BOUNCE7 is similar to that used by the LAND3 and LAND4, and need not be repeated here.

The LAND1 is used to monitor whether the aircraft has touched the ground. If the aircraft has touched the ground, the LAND1 activates the trigger BOUNCE8. The BOUNCE8 determines the long landing message or the short landing message should be generated according to whether or not the hop occurs when the aircraft lands. At last, format conversion is performed on the landing parameters for two landings so that the values in the message are convenient to be read and printed and the corresponding landing message is generated.

According to one embodiment of the present invention, it is determined whether the hop occurs when landing using the following method. The BOUNCE1 read continuously the position state of the PSEU of the shock struts in the left and right main landing gears at the frequency of 32 times/sec, so as to determine whether the position state changes in $1/32$ second. When the position state changes from "0" to "1", the BOUNCE1 starts a counter to accumulate the count. Only when the value of the counter is greater than 16, the BOUNCE1 will activates the BOUNCE2 and BOUNCE3, which means the two main landing gears have been compressed and kept compressed for at least 0.5 second. If the condition is not met, the counter is cleared and accumulates again.

Hereafter, taking the left main landing gear as an example, the right main landing gear can be processed using the same manner.

When the BOUNCE2 operates, it proceeds to detect continuously the position state of the compression PSEU in the left main landing gear at the frequency of 32 times/sec. When the value is "0", the counter start to accumulate count. Only when the value of the counter is greater than 32, the BOUNCE4 will be activated. At present, the shock strut of the left main landing gear is in its extension state, and keeps in that state for more than 1 second. When the condition is not met, the counter is cleared and accumulates count again.

The detection principle of the BOUNCE4 is similar to that of the BOUNCE2. When the value is "0", the counter start to accumulate count. When the value is "1", the accumulated value of the counter is determined. If the accumulated value of the counter is less than 320, it is determined that the hop occurs on the left main landing gear. At present, the period (i.e., time in air), in which the shock strut of the left main landing gear keeps in the extension state, is less than 10 seconds. And then it is in the compression state again.

In a summary, the three conditions of the method for determining whether the hop occurs in this embodiment are the following:

1. determining whether the left and right main landing gears are in the compression state and keep in that state for more than 0.5 second;

2. determining whether any one of the left and right main landing gears is in the extension state again and keeps in that state for more than 1 second; and 3. determining whether any one of the left and right main landing gears is in the extension state again and keeps in that state for less than 10 seconds.

If the above conditions are met, it is determined that the hop occurs during the landing of aircraft.

According to one embodiment of the present invention, after the BOUNCE8 operates for 30 seconds, it is determined according to the values of the BOUNCED, LONGLRPT and BRPTCODE whether the long message or the short message should be generated, wherein, the meanings of the parameters are as follows:

BOUNCED: state parameter indicating that hop occurs, and being set after BOUNCE4 or BOUNCE5 detects the hop;

LONGLRPT: state parameter indicating that long message might be generated, and being set by trigger LAND2/2B when vertical load is over the limit during first touchdown.

BRPTCODE: message trigging code, which is set when the trigger BOUNCE7 detects that the parameters are above their limits during second touchdown.

BOUNCE8 uses the above parameters and determines whether long or short messages shall be generated.

Specifically, please refer to the table below

| BOUNCED | LONGLRPT | BRPTCODE | message type |
|---------|----------|----------|--------------|
| 0 | 1 | NIL | short message |
| 1 | 1 | NIL | long message |
| 1 | 0 | 4500 | long message |

FIG. 8 is an example of the short landing message according to one embodiment of the present invention. As shown, it can be seen from the figure that the vertical speed RALR is only 1.8 ft/sec during this landing. The vertical acceleration VRTA is 1.64 G, which is in the range of normal landing. However, the lateral acceleration is 0.21 G, which may be a slight higher. In this case, even the flight crew reports that the relatively hard landing occurs, it is easy to see that this landing is normal and the hard or heavy landing does not occur according to the short landing message.

FIG. 9 is an example of the long landing message according to one embodiment of the present invention. As shown, it can be seen from the figure that the hop occurs during this landing. In the process of the first touchdown, the RALR is 7.2 ft/sec and the VRTA is 2.07 G. The RALR is in the normal range, and the VRTA also is below the threshold value thereof. In the process of the second touchdown, the RALR is 1.5 ft/sec and the VRTA is 2.65 G. Therefore, the hop occurs during landing, and vertical load during second touchdown exceeds its limit.

The flight crew can obtain the landing message from a nonvolatile memory of the DMU and also can print the landing message in the cockpit, or the performance monitoring staff can read the landing message downloaded from an air-ground data link system through a ground station to realize the monitoring of the landing performance of the aircraft, so as to ensure the abnormal condition can be found timely and accurately. In such manner, a lot of data processing and checking, which are used to determine whether the aircraft has a hard or heavy landing, can be avoided, and thus the down time of the aircraft can be saved and the utilization of the aircraft can be improved; meanwhile, the aircraft can avoid to operate with security risks and the security risks can be eliminated. The recorded data further help the flight quality monitoring department to estimate operation technique quality of the flight crew.

The ACMS of Airbus is taken as an example in the present invention, but the application of the present invention is not limited thereto. The present invention also can use the AHM of Boeing and thus can be applied to the aircrafts of Boeing.

Compared with conventional technique, in the embodiments of the present invention, the ACMS collects landing data at the time right before and after touchdown when the aircraft touches down, and the landing message is generated, and then it is determined whether the aircraft has the hard or heavy landing. In such manner, accurate measures can be performed without transmitting the original data to the aircraft manufacturers to perform analysis, and thus the processing time can be saved, and the cost of maintenance and operation of the airlines can be reduced significantly. Meanwhile, the method of the present invention is more accurate, and can improve safety performance of the aircraft to ensure the safety of passengers. In addition, it also helps the flight quality monitoring department to estimate operation technique quality of the flight crew through those collected and recorded data.

The above embodiments of the invention have been disclosed for illustrative purposes and the invention is not to be limited to the particular forms or methods disclosed. Those skilled in the art will appreciate that various modifications, additions and substitutions are possible. Therefore, the invention is to cover all modifications, equivalents and alternatives falling within the scope of the appended claims.

The invention claimed is:

1. A method for detecting landing quality of an aircraft, comprising:
   determining whether a vertical speed rate is greater than a first preset value when the aircraft lands by an aircraft data system;
   determining whether a vertical acceleration is greater than a second preset value when the aircraft lands in response if the vertical speed rate is not greater than the first preset value when the aircraft lands by the aircraft data system;
   collecting landing data by the aircraft data system;
   generating a landing message based on the collected landing data in response if the vertical speed rate is greater than the first preset value or the vertical acceleration is greater than the second preset value when the aircraft lands by the aircraft data system;
   storing or transmitting the landing message by the aircraft data system; and
   determining the landing quality of the aircraft based on the landing data in the landing message by the aircraft data system.

2. A method according to claim 1, wherein the aircraft data system comprises ACMS or AHM to collect the landing data and generate the landing message.

3. A method according to claim 1, wherein the landing data includes: radio altitude RALT, vertical speed rate RALR, pitch angle PTCH, pitch speed rate PTCR, roll angle ROLL, roll speed rate ROLR, and yaw speed rate YAW at a time of 1 second before a touchdown.

4. A method according to claim 1, wherein the landing data includes: radio altitude RALT, vertical speed rate RALR, pitch angle PTCH, pitch speed rate PTCR, roll angle ROLL, roll speed rate ROLR, and yaw speed rate YAW at a time of a touchdown.

5. A method according to claim 1, wherein the landing data includes: maximum values and minimum values of vertical load VRTA, longitudinal load LONA and lateral load LATA during a period from 1 second before a touchdown to the touchdown.

6. A method according to claim 1, wherein the landing data includes: maximum values and minimum values of vertical load VRTA, longitudinal load LONA and lateral load LATA during a period from 1 second before a touchdown to 3 seconds after the touchdown.

7. A method according to claim 1, further comprising:
   determining whether hard or heavy landing occurs through determining whether the value of the vertical speed rate or the vertical acceleration when landing is greater than their respective limit values.

8. A method according to claim 7, wherein the limit values of the vertical speed rate or the vertical acceleration are first values where a landing weight of the aircraft is less than or equal to a maximum landing weight;
   the limit values of the vertical speed rate or the vertical acceleration are second values where the landing weight of the aircraft is greater than the maximum landing weight; and
   the first values are greater than the second values.

9. A method according to claim 1, further comprising:
   determining whether the aircraft touches down.

10. A method according to claim 9, further comprising:
starting a first trigger configured for monitoring whether the aircraft touches down when a slat release is more than 5° and a flight altitude is less than 10000 feet.

11. A method according to claim 10, further comprising:
starting a second trigger in response to the touchdown of the aircraft, wherein the second trigger is configured to determine whether the vertical speed rate at a time of the touchdown and in a period from 0.5 second before the touchdown to the touchdown is greater than the first preset value or the vertical acceleration at a time of the touchdown and in a period from 0.5 second before the touchdown to the touchdown is greater than the second preset value.

12. A method according to claim 11, further comprising:
starting a third trigger, which is configured to determine whether the vertical speed rate in a period from the touchdown to 0.5 second after the touchdown is greater than the first preset value or the vertical acceleration in a period from the touchdown to 0.5 second after the touchdown is greater than the second preset value.

13. A method according to claim 10, further comprising:
starting a fourth trigger in response to the touchdown of the aircraft, wherein the fourth trigger is configured for recording the following data:
values of the RALT, RALR, PTCH, PTCR, ROLL, ROLR and YAW at a time of 1 second before a landing time; and
values of the RALT, RALR, PTCH, PTCR, ROLL, ROLR and YAW at a time of the landing time.

14. A method according to claim 10, further comprising:
starting a fifth trigger in response to the touchdown of the aircraft, wherein the fifth trigger is configured to record maximum values and minimum values of the VRTA, LONA LATA and RALR during a period from 1 second before the landing time to 3 seconds after the landing time.

15. A method according to claim 10, further comprising:
determining whether the aircraft touches down again and whether the vertical acceleration exceeds the second preset value during the second touchdown;
recording the following data in response if the vertical acceleration exceeds the second preset value during the second touchdown
values of the RALT, RALR, PTCH, PTCR, ROLL, ROLR and YAW at a time of 1 second before the second touchdown,
values of the RALT, RALR, PTCH, PTCR, ROLL, ROLR and YAW at a time of the second touchdown,
maximum values and minimum values of VRTA, LONA, LATA and RALR in a period from 1 second before the second touchdown to 3 seconds after the second touchdown.

* * * * *